United States Patent Office 2,997,028
Patented Aug. 22, 1961

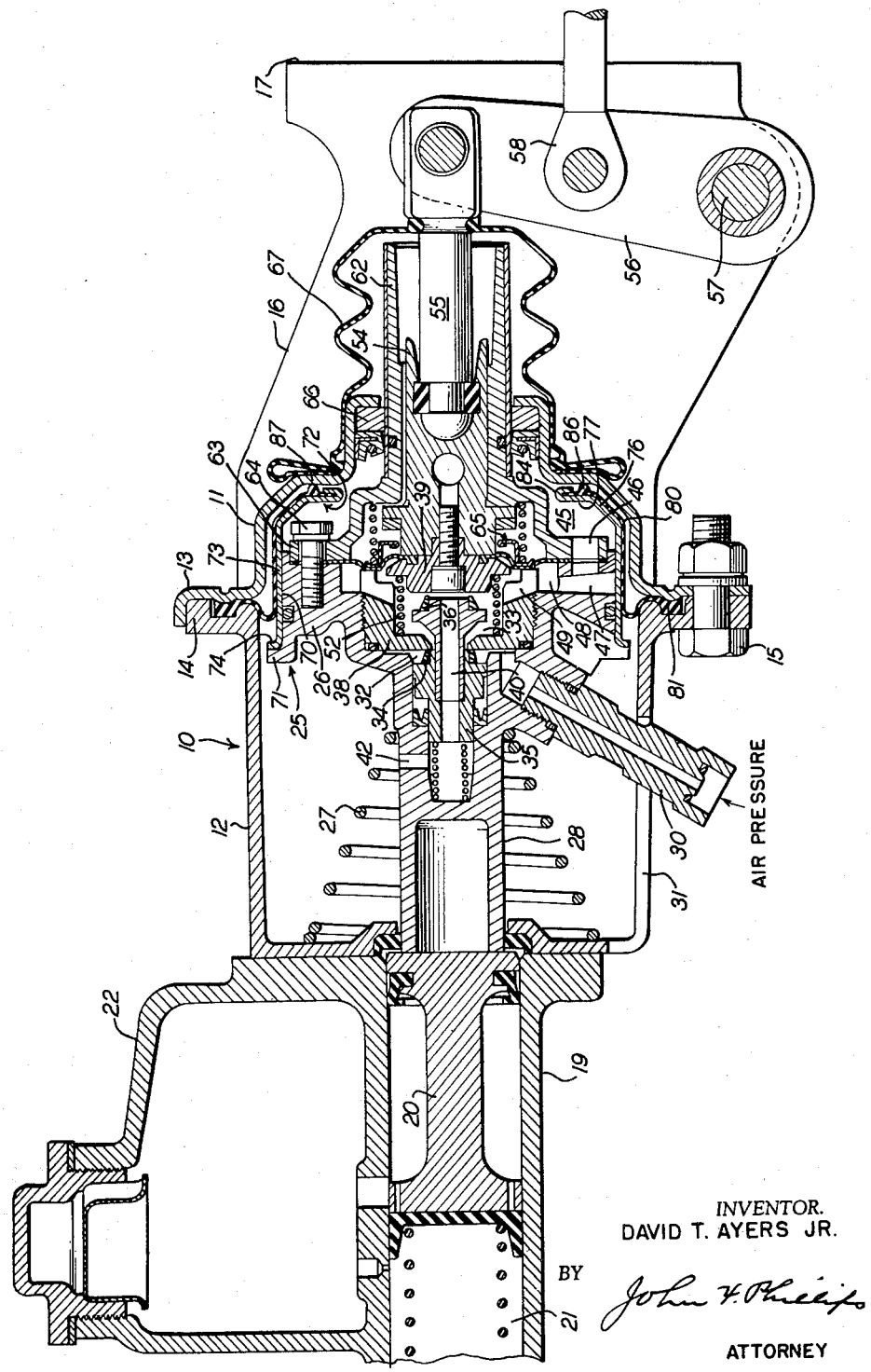

2,997,028
FLUID PRESSURE MOTOR STRUCTURE
David T. Ayers, Jr., Birmingham, Mich., assignor to Kelsey-Hayes Company, Detroit, Mich., a corporation of Delaware
Original application July 9, 1958, Ser. No. 747,424, now Patent No. 2,953,120, dated Sept. 20, 1960. Divided and this application Oct. 9, 1959, Ser. No. 845,430
9 Claims. (Cl. 121—41)

This invention relates to a fluid pressure motor structure and is a division of my copending application for a booster brake mechanism, Serial No. 747,424, filed July 9, 1958, now Patent 2,953,120, granted September 20, 1960.

The invention disclosed and claimed in the copending application referred to relates to a booster brake motor mechanism particularly intended to be operated by a source of super-atmospheric pressure, and is characterized by numerous structural and functional advantages so far as concerns the follow-up valve mechanism for the motor, the means for transmitting to the brake pedal reaction forces occurring incident to the application of the brakes, etc. There are incidentally shown in such copending application motor structural features of a novel nature not directly related to the valve mechanism, reaction means, etc. of the motor, but capable of use in other types of fluid pressure motors, including slave motors subject to operation by valve mechanisms externally of the motor.

An important object of the present invention is to provide a motor structure having a pressure responsive unit therein subject to operation by differential pressures at opposite sides thereof and including, in part, a diaphragm and a novel means for supporting said diaphragm with respect to the pressure responsive unit.

A further object is to provide such a motor structure wherein the diaphragm forming part of the pressure responsive unit is of the rolling type, and wherein novel means is employed, carried by the pressure responsive unit, for supporting the diaphragm when the parts are in normal off positions and during the operation of the motor.

A further object is to provide such a novel structure which is of a simplified nature and greatly facilitates the assembly of the mechanism and the servicing thereof.

A further object is to provide a mechanism of the character referred to wherein the connection of the diaphragm to the supporting means therefor and to the motor casing structure is highly simplified, and wherein a portion of the diaphragm may be utilized for limiting movement of the pressure responsive unit to its off position and for silencing the return movement of the pressure responsive unit to normal position.

Other objects and advantages of the invention will become apparent during the course of the following description.

In the drawing I have shown one embodiment of the invention.

In the drawing, the figure is an enlarged fragmentary axial sectional view through the motor mechanism and associated elements.

Referring to the drawing, the numeral 10 designates a motor casing as a whole comprising casing sections 11 and 12 respectively flanged as at 13 and 14 to be secured together, in the present instance, by bolts 15. The particular means for securing the two casing sections together is of no particular importance, as further referred to below.

The motor mechanism is primarily intended for use as a vehicle brake booster mechanism, and to this end is provided with a bracket 16, one end 17 of which is adapted for connection with the vehicle fire wall (not shown). The bracket 16 is fixed to the casing section 11 and projects therefrom rearwardly longitudinally of the vehicle, as will be apparent. At the opposite end of the casing section 12 is secured a conventional master cylinder 19 having a plunger 20 therein for displacing into the hydraulic brake lines fluid from a hydraulic chamber 21. Fluid is supplied to the master cylinder from the usual reservoir 22.

Within the casing sections is arranged a pressure responsive unit indicated as a whole by the numeral 25 and comprising a preferably cast body 26, biased to off position by a spring 27, and provided with an axially extending force transmitting member 28, preferably integral with the body 26, and abutting the plunger 20 to deliver force thereto.

The valve mechanism for controlling the motor is described in detail in my copending application and need not be so described in the present application. The mechanism is intended in the present case to derive its power from a source of super-atmospheric pressure to which is connected a nipple 30 movable in a longitudinal slot 31 formed in the casing section 12. The nipple 30 delivers pressure to a chamber 32 adapted to communicate with a chamber 33, but normally cut off from such communication by a valve 34 carried by a valve body generally indicated by the numeral 35. Such a valve body is shown in the present case as being of two parts and as carrying an exhaust valve 36. The valve 34 normally engages a seat member 38, and the valve 36 is normally disengaged from its seat member 39 so that the chamber 33 normally communicates with a passage 40 through the valve body 35. This passage, in turn, communicates through a port 42 with the interior of the casing section 12 which is open to the atmosphere as at 31. Accordingly atmospheric pressure is normally present in the chamber 33.

Between the pressure responsive unit 25 and the casing section 11 is formed a motor chamber 45 communicating through ports 46 and 47 with a chamber 48 which, in turn, communicates with the chamber 33 through grooves 49 formed in the valve seat member 38.

The valve seat member 39 is biased to off position by a spring 52, and the member 39 is carried by a pedal-operable member 54 operable by a rod 55. This rod is movable by a lever 56, pivoted to the bracket 16 as at 57 and operable, in turn, by a push rod 58 connected to the brake pedal (not shown).

The member 54 is slidable in an axially extending sleeve portion 62 formed integral with a casting 63 secured as at 64 to the cast body 26 and forming in effect a part thereof. Associated with the valve operating mechanism is a reaction transmitting device generally indicated as a whole by the numeral 65. This device forms no part of the present invention but is described and claimed in my copending application referred to.

The sleeve member 62 is axially slidable in a combined sealing and bearing unit 66 carried by the casing section 11. An axially expansible boot 67 is connected between the casing section 11 and the push rod 55.

The cast body 26 is provided with a cylindrical surface 70, at one end of which is formed an annular shoulder 71. A rigid diaphragm support, indicated as a whole by the numeral 72, is formed of sheet metal and is provided with a cylindrical outer portion 73 in which is received the cylindrical surface 70 of the cast body 26. One end of the cylindrical portion 73 is turned outwardly to form a flange 74 seating against the shoulder 71 to limit movement of the diaphragm support to the left in the drawing, the support being assembled with respect to the cast body 26 by sliding it thereover from the right-hand end thereof prior to assembling the pressure responsive unit in the motor.

The right-hand end of the cylindrical portion 73 of the diaphragm support extends to the right beyond the cylindrical surface 70 and over adjacent portions of the pressure responsive unit, then turns inwardly to form a frusto-conical portion 76 terminating in a radially inwardly extending flange 77.

Surrounding the diaphragm support 72 is a rolling diaphragm 80 having an outer peripheral bead 81 clamped between the flanges 13 and 14. As previously stated, the particular formation of adjacent ends of the casing sections 11 and 12 and the means for connecting them together is of no specific importance in the present invention, it being possible to secure the bead 81 to the casing sections in other relations to the casing of the motor to seal the chamber 45 from the interior of the casing section 12.

The diaphragm 80, radially inwardly of the bead 81, follows and fits around the diaphragm support 72 and has its radially inner edge secured to the support 72 by clamping the radially inner edge portion of the support 72 around the adjacent portion of the diaphragm as at 84. Thus one edge of the diaphragm 80 is fixed to the support 72, while the other edge of the diaphragm, namely the bead 81, is secured to the motor casing in sealed relation thereto.

The diaphragm 80, radially outwardly of the bead or bent-over end 84, is provided with bosses 86 extending beyond the free edge of the bead 84 and engaging a vertical wall portion 87 of the casing section 11. The bosses 86 limit movement of the pressure responsive unit 25 to its normal off position shown in the drawing, and silence such movement, the diaphragm 80 obviously being formed of rubber or similar resilient material.

*Operation*

The operation of the motor is fully described in my copending application referred to and need be only briefly described here. The parts normally occupy the positions shown in the drawing, the valve 34 being closed and the valve 36 open. Upon operation of the brake pedal, the rod 58 swings the lever 56 to transmit movement to the member 54 through the rod 55. Initial movement of the parts referred to engages the seat 39 with the valve 36, thus disconnecting the chamber 33, and consequently the motor chamber 45, from the atmospheric passage 40. Upon slight further movement of the members 54 and 39, the latter will impart movement to the valve body 35 to open the valve 34, thus admitting super-atmospheric pressure from the chamber 32 to the chamber 33, and thence to the motor chamber 45. The pressure responsive unit 25 thus will be caused to move to the left to transmit movement to the master cylinder plunger 20 to displace fluid from the chamber 21 into the vehicle brake lines (not shown). The valve mechanism obviously causes the pressure responsive unit 25 to partake of a follow-up action relative to movement of the brake pedal.

Pressure in the chamber 45 acts against the right-hand side of the pressure responsive unit 25, including the right-hand face of the diaphragm 80 radially outwardly of the cylindrical portion 73 of the support 72. The support 72 moves to the left with the body 26, and the diaphragm 80 rolls along the cylindrical portion 73 of the diaphragm support. When the brake pedal is released, the parts of the valve mechanism will return to normal position, thus opening the motor chamber 45 to the atmosphere as described above, and the spring 27 will return the pressure responsive unit to normal off position. When such unit reaches normal off position, its movement will be arrested and silenced by engagement of the resilient lugs 86 with the casing wall 87 of the casing section 11.

It will be apparent that the use of the support 72 provides a novel means for connecting a rolling diaphragm to the pressure responsive unit of a fluid pressure motor. The structure is applicable to any type of pressure responsive unit so long as it has a surface around which the support 72 will fit. In other words, it is not necessary that the pressure responsive unit contain an operating valve mechanism for the motor, since the means forming the subject matter of the present invention can be used with equal facility in conjunction with the pressure responsive unit of a slave motor or a motor having an external control valve mechanism.

It will be noted that the maximum diameter of the pressure responsive unit, aside from the support 72 and diaphragm 80, is represented by the cylindrical surface 70, except for the shoulder 71 against which the right-hand end of the support 72 seats. The portions of the body 63 within the support 72 are of such reduced size that the entire pressure responsive unit, excluding the support 72 and diaphragm 80, may be assembled externally of the motor. The support 72 is then assembled on the body 26 by moving it from the right-hand end thereof, the support portion 73 sliding over the surface 70 until its movement is limited by the shoulder 71. The entire pressure responsive unit then may be moved into position relative to the casing section 12, whereupon the casing section 11 and associated elements may be moved into the position and the bolts 15 applied to clamp the bead 81 between the casing sections 11 and 12. Thus it will be apparent that the construction is simple and highly efficient in operation and is also economical to produce and install in a motor. Supports 72 and diaphragms 80 of the same size may be used in various types of motors, as stated above, most motors used for the purpose of the present one having casings of corresponding diameter. Accordingly, it is not necessary to stock a number of different sizes of supports 72 and diaphragms 80.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In a fluid pressure motor structure, a casing, and a pressure responsive unit in said casing comprising an axial rigid structure having a surrounding surface of substantial area spaced radially inwardly of said casing, a diaphragm support corresponding in shape to and surrounding and solely frictionally engaging said surface and having a portion projecting axially in one direction beyond said surface and extending radially inwardly, and an annular resilient diaphragm surrounding and engaging said support, said diaphragm being secured at its outer periphery to said casing and at its inner periphery solely to said radially inwardly extending portion of said support.

2. In a fluid pressure motor structure, a casing, and a pressure responsive unit in said casing comprising an axial rigid structure having a surrounding surface of substantial area spaced radially inwardly of said casing, a diaphragm support corresponding in shape to and surrounding and solely frictionally engaging said surface and having a portion projecting axially in one direction beyond said surface and extending radially inwardly, and an annular resilient diaphragm surrounding and engaging said support, said diaphragm being secured at its outer periphery to said casing and at its inner periphery solely to said radially inwardly extending portion of said support, said pressure responsive unit having a normal off position in which said radially inwardly extending portion of said support lies adjacent an end portion of said casing, said diaphragm having lugs projecting axially beyond said radially inwardly extending portion of said support and engaging said end portion of said casing to limit movement of said pressure responsive unit to said off position.

3. In a fluid pressure motor structure, a casing comprising a pair of casing sections arranged end to end and having adjacent ends adapted to be clamped together, and a pressure responsive unit within said casing comprising a rigid axial body having a cylindrical radially outer surface spaced radially inwardly of said casing sections, a rigid diaphragm support formed of sheet material provided with a cylindrical portion at one end surrounding and solely frictionally engaging said cylindrical surface, the other end portion of said support extending axially beyond said cylindrical surface and terminating in a radially inwardly extending portion, and an annular resilient diaphragm surrounding and engaging said support, said diaphragm having its radially outer periphery clamped between said adjacent ends of said casing sections, the radially inner periphery of said diaphragm being fixed solely to said radially inwardly extending portion of said support.

4. In a fluid pressure motor structure, a casing comprising a pair of casing sections arranged end to end and having adjacent ends adapted to be clamped together, and a pressure responsive unit within said casing comprising a rigid axial body having a cylindrical radially outer surface spaced radially inwardly of said casing sections, a rigid diaphragm support formed of sheet material provided with a cylindrical portion at one end surrounding and solely frictionally engaging said cylindrical surface, the other end portion of said support extending axially beyond said cylindrical surface and terminating in a radially inwardly extending portion, and an annular resilient diaphragm surrounding and engaging said support, said diaphragm having its radially outer periphery clamped between said adjacent ends of said casing sections, said radially inwardly extending portion of said support terminating in a bead bent over the radially inner periphery of said diaphragm to secure the latter solely to said support, said pressure responsive unit having a normal off position in which said bead lies adjacent, but out of contact with, an end wall portion of one casing section, and a bumper formed integral with said diaphragm adjacent said bead and contacting with said end wall portion of said one casing section when said pressure responsive unit is in said normal off position.

5. In a fluid pressure motor structure, a pair of casing sections arranged end to end and having adjacent end flanges engageable with each other, and a pressure responsive unit within said casing sections comprising a rigid axial body provided with a radially outer surface spaced radially inwardly of said casing sections and provided at one end with an outstanding annular shoulder, a rigid sheet metal diaphragm support having one end corresponding in shape to and surrounding and solely frictionally engaging said outer surface and having its extremity at such end thereof engageable with said shoulder to limit movement of said support axially in one direction relative to said rigid body, the other end portion of said support extending beyond said surface and terminating in a radially inwardly extending portion, and a resilient rolling diaphragm having portions surrounding and engaging said diaphragm support and provided with a radially outer periphery clamped between said flanges of said casing sections, the radially inner periphery of said diaphragm being fixed solely to said radially inwardly extending portion of said support.

6. A mechanism according to claim 5 wherein said radially inwardly extending portion of said support is provided with a radially outwardly turned bead clamped to said radially inner periphery of said diaphragm, said pressure responsive unit having a normal off position in which said radially inwardly extending portion of said support lies adjacent and spaced from an end wall portion of one of said casing sections, said diaphragm adjacent said bead having an axially projecting bumper engaging said end wall portion of said one casing section when said pressure responsive unit is in said normal off position.

7. A booster motor mechanism comprising a casing, a pressure responsive unit therein comprising a cast body having a substantially cylindrical outer surface, an annular diaphragm support having a cylindrical portion fitting over and solely frictionally engaging said cylindrical outer surface of said cast body, and a diaphragm fixed at its outer periphery to said casing and at its inner periphery solely to said diaphragm support, said support having an outer surface engageable with said diaphragm to support the latter during movement of said pressure responsive unit, said casing and said pressure responsive unit defining therebetween a variable pressure motor chamber, a valve mechanism in said cast body normally connecting said variable pressure chamber to one source of pressure and operable to connect such chamber to a source of different pressure, and means for operating said valve mechanism.

8. A mechanism according to claim 7 wherein said diaphragm support projects axially from said cast body into said variable pressure chamber, the axially projecting portion of said support being crimped over said inner periphery of said diaphragm to fix it with respect to said support.

9. A mechanism according to claim 7 wherein said diaphragm support projects axially in one direction from said cast body into said variable pressure chamber and terminates in a radially inwardly projecting portion crimped over said inner periphery of said diaphragm to fix it with respect to said support, said casing having a wall, said diaphragm having a projecting bumper engaging said casing wall when said pressure responsive unit is in a normal off position.

References Cited in the file of this patent

UNITED STATES PATENTS

| | | |
|---|---|---|
| 2,587,404 | Stelzer | Feb. 26, 1952 |
| 2,761,427 | Shumaker | Sept. 4, 1956 |
| 2,929,215 | Stelzer | Mar. 22, 1960 |
| 2,929,216 | Stelzer | Mar. 22, 1960 |